(Model.)
S. B. HART.
Spring Hoe Attachment for Seeding Machine.
No. 234,566.     Patented Nov. 16, 1880.
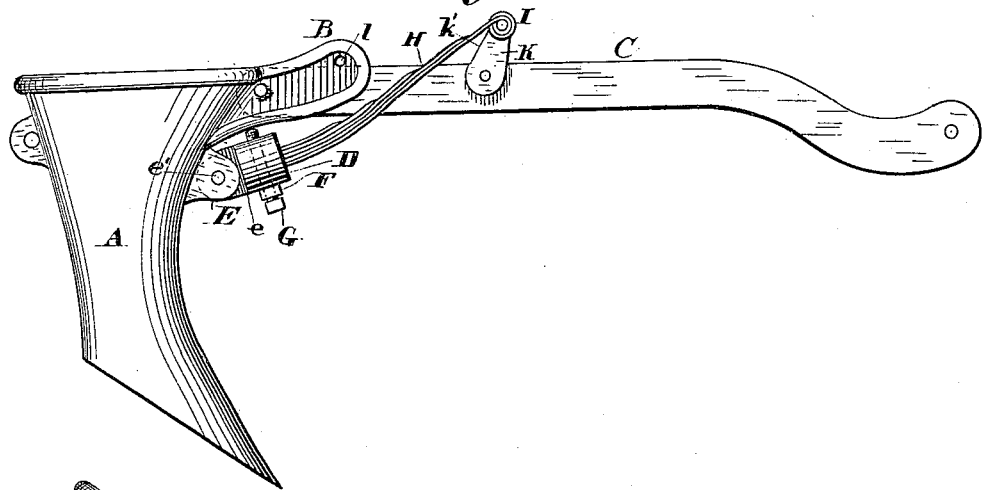
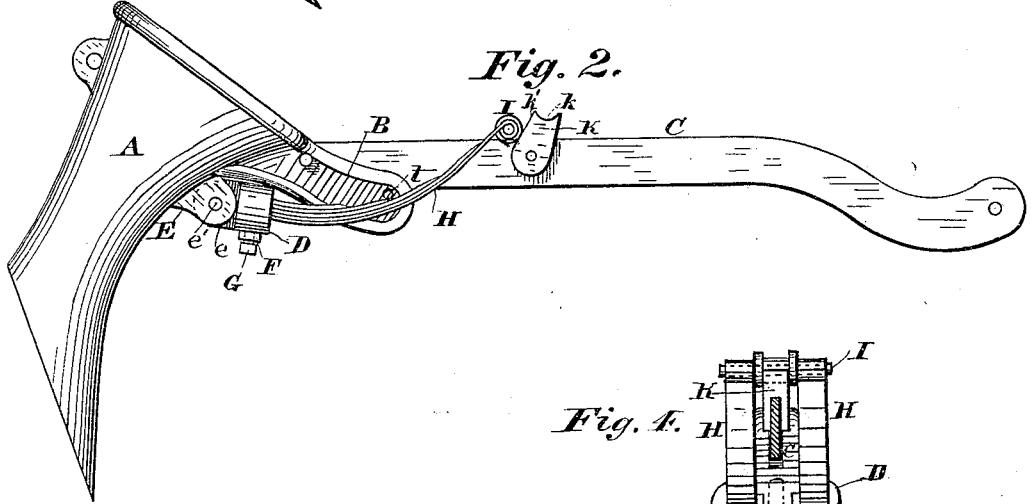
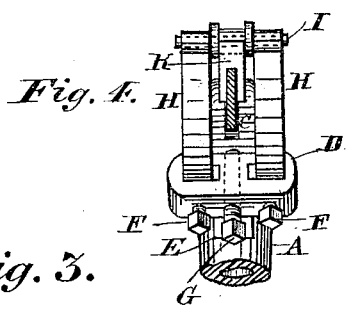
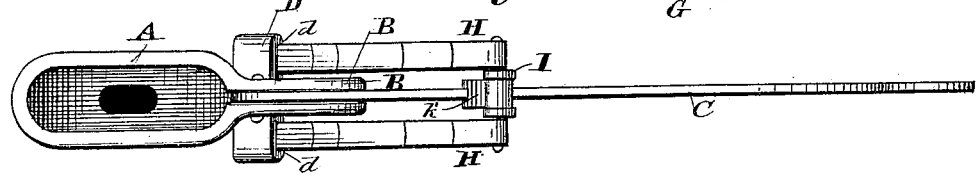
Witnesses:
Albert H. Norris
J Henry Kaiser
Inventor:
Stacy B. Hart,
By James L. Norris.
Attorney.

UNITED STATES PATENT OFFICE.

STACY B. HART, OF PEORIA, ILLINOIS.

SPRING-HOE ATTACHMENT FOR SEEDING-MACHINES.

SPECIFICATION forming part of Letters Patent No. 234,566, dated November 16, 1880.

Application filed October 7, 1880. (Model.)

*To all whom it may concern:*

Be it known that I, STACY B. HART, a citizen of the United States, residing at Peoria, in the county of Peoria and State of Illinois, have invented new and useful Improvements in Spring-Hoe Attachments for Seeding-Machines, of which the following is a specification.

The nature of my invention relates to spring-hoe attachments for seeding-machines, which are designed to afford a flexible connection between the hoe and the drag-bar, in order to prevent injury to the parts in case of the hoe striking against roots or other obstructions in its free passage through the ground.

My improvement consists, first, in inclined springs connecting at their lower ends with the pivoted hoe, and arranged at their upper free ends to exert a downward pressure upon a bearing on the drag-bar; second, in the combination with the drag-bar and pivoted hoe, in a seeding-machine, of the inclined springs secured at their lower ends to a holder, which is hinged to the hoe, and at their upper free ends arranged to exert a downward pressure upon a bearing on the drag-bar; third, in the combination, with the pivoted hoe, in a seeding-machine, of the inclined springs connected with the hoe at their lower ends at a point below the pivotal connection, between the hoe and the drag-bar, and connected together at their upper ends by a bar or roller above the drag-bar, the said springs being arranged to cause their connecting bar or roller to bear constantly upon a bearing on the drag-bar; fourth, in the combination, with the pivoted hoe and the drag-bar in a seeding-machine, of the springs connected at their lower ends with the hoe below the drag-bar, and at their upper ends connected together above the drag-bar by a bar or roller, and a stop and bearing piece upon the drag-bar formed with a curved upper edge, serving as a stop for the connecting bar or roller, and with an inclined rear edge, upon which said connecting bar or roller bears and travels when the hoe is swung upon its pivot; fifth, in the combination, with the pivoted hoe and the drag-bar in a seeding-machine, of a holder for the springs hinged to the hoe below its pivotal connection with the drag-bar, a set-screw carried by said hinged holder and arranged to adjust the position of the same relatively to the hoe, in order to regulate the spring-pressure upon the drag-bar, and the springs secured in said holder and connected at their upper ends by a bar or roller arranged to bear upon a bearing in the drag-bar; sixth, in the hoe formed with a mortise in an extension at its front upper portion, the drag-bar pivoted at its rear end in said mortise, a holder for the springs hinged between ears projecting from the hoe below said mortised extension, a pair of inclined springs detachably and adjustably secured in said holder and extending up at the sides of the drag-bar, a bar or roller connecting said springs above the drag-bar, and a stop and bearing-piece upon the drag-bar for said connecting bar or roller of the springs, all as hereinafter more fully explained.

In the drawings, Figure 1 is a side elevation of the hoe and drag-bar with my improvements applied thereto. Fig. 2 is a like view, with the hoe swung back and the bar which connects the upper ends of its springs in position against the incline of the bearing on the drag-bar. Fig. 3 is a top or plan view of Fig. 1; and Fig. 4 is an end view, with the drag-bar in section and the hoe broken off.

In my spring-hoe the rear end of the drag-bar is pivoted within a mortise formed in an extension of the upper front portion of the hoe, and the forward end of the drag-bar is connected to the machine in the usual way. Below this mortised extension in which the drag-bar is thus pivoted a pair of ears are formed to project from the hoe, and between these ears is hinged, by means of an ordinary pintle, a holder, in which are secured the lower ends of the springs. This hinged holder for the springs is formed with mortises, in which the ends of the springs are inserted and in which they are held by means of set-screws. The springs, which are preferably of the many-leaved construction, incline upwardly from their hinged holder toward the forward end of the drag-bar, and, passing across the sides of the drag-bar at an angle to the length thereof, extend to a point above the drag-bar, where they are connected to each other by means of a bar or roller.

While the hoe just described is in its normal position—that is to say, when it is not swung back against the spring-resistance—this bar or roller, which connects the two upper ends of the springs together, rests in a curved bearing or stop of a block or projection upon the drag-bar; and in order to regulate the spring-pressure the holder for the spring carries a set-screw arranged to bear at its point against the under side of the mortised extension of the hoe, whereby the power of the spring is governed according to the extent to which the said holder is adjusted from the mortised extension by the set-screw. The stop and bearing block or piece which rises from the top side of the drag-bar is formed with its rear edge inclined downward toward the hoe, so that when the hoe is turned upon its pivotal connection with the drag-bar, the bar or roller which connects the upper ends of the springs will ride down over the said inclined edge of the stop and bearing piece, thus admitting of such swinging movement of the hoe, and at the same time bending the springs, in order to provide for the requisite degree of spring-resistance in this yielding connection between the hoe and drag-bar. By means of this yielding flexible connection the hoe will, under ordinary circumstances, maintain the position which brings the bar or roller at the upper ends of the springs upon the bearing of the stop-piece; but when the hoe comes in contact with roots or other obstacles in the field there will be a sufficient yield of the spring-attachment to prevent injury to the devices, the resiliency of the springs, which are bowed when the bar or roller traverses the incline of the stop and bearing, always causing the return of the bar or roller to the curved stop-bearing and the adjustment of the hoe to its normal position as soon as the hoe has been relieved of such obstruction.

The letter A refers to the hoe, and B to the mortised extension at the upper front portion, in which the rear end of the drag-bar C is pivoted. The holder D for the springs is represented as consisting of a block formed with mortises $d\ d$, in which the ends of the springs are inserted, and a lug, $e$, which is hinged between the projecting ears E of the hoe by means of a pintle, $e'$, passing through the said ears and lug.

The set-screws F, which secure the ends of these springs within the mortises of the hinged holder, pass through screw-threaded holes in the latter, so as to bear against the springs, and by this means should either or both of the springs break they can be readily removed for repairs or replacement by others by loosening the screws which hold them in place. The ends of the springs, which are arranged in the mortises $d$ of the holder D, are adapted to be adjusted therein for lengthening or shortening the springs for the purpose of adjusting the vertical position and draft of the hoe, thereby controlling the set or angle of the latter.

The long set-screw G, which adjusts the hinged holder for the springs toward or away from the extension B of the hoe, passes through the holder D, so that its end will bear against the said extension, it being held in contact with the same by reason of the springs H H. As herein illustrated, these springs are each composed of several leaves, and the upper end of the longest leaf of each spring is connected with a bar, I, which, if preferred, may be adapted to act as a roller by means of a sleeve arranged thereon between the two springs.

The stop and bearing-piece K upon the drag-bar is formed with the curved stop-bearing $k$ at its upper edge, and with the rear inclined edge, $k'$, over which the bar or roller moves when the hoe is swung upon its pivot.

I would here state that the bifurcated extension B is provided with the usual aperture $l$, for the passage of a wooden or other pin, the object of such in the present case being to provide means for rendering the hoe effective and operative in case the spring attachment becomes broken or injured.

Having thus described my invention, what I claim is—

1. In a spring-hoe attachment for seeding-machines, the inclined springs connecting at their lower ends with the pivoted hoe and arranged at their upper free ends to exert a downward pressure upon a bearing on the drag-bar, substantially as described.

2. The combination, with the drag-bar and pivoted hoe in a seeding-machine, of the inclined springs secured at their lower ends to a holder which is hinged to the hoe, and at their upper free ends arranged to exert a downward pressure upon a bearing on the drag-bar, substantially as described.

3. The combination, with the pivoted hoe in a seeding-machine, of the inclined springs connected with the hoe at their lower ends at a point below the pivotal connection between the hoe and the drag-bar, and connected together at their upper ends by a bar or roller above the drag-bar, the said springs being arranged to cause their connecting bar or roller to bear constantly upon a bearing on the drag-bar, substantially as described.

4. The combination, with the pivoted hoe and the drag-bar in a seeding-machine, of the springs connected at their lower ends with the hoe below the drag-bar, and at their upper ends connected together above the drag-bar by a bar or roller, and a stop or bearing-piece upon the drag-bar formed with a curved upper edge, serving as a stop for the connecting bar or roller, and with an inclined rear edge upon which said connecting bar or roller bears and travels when the hoe is swung upon its pivot, substantially as described.

5. The combination, with the pivoted hoe and the drag-bar in a seeding-machine, of a holder for the spring hinged to the hoe below its pivotal connection with the drag-bar, a set-screw carried by said hinged holder and arranged to adjust the position of the same relatively to the hoe, in order to regulate the spring-pressure upon the drag-bar, and the springs secured in said holder and connected at their upper ends by a bar or roller arranged to bear upon a bearing on the drag-bar, substantially as described.

6. In a seeding-machine, the hoe formed with a mortise in an extension at its front upper portion, the drag-bar pivoted at its rear end in said mortise, a holder for the springs hinged between ears projecting from the hoe below said mortised extension, a pair of inclined springs detachably and adjustably secured in said holder and extending up at the sides of the drag-bar, a bar or roller connecting said springs above the drag-bar, and a stop and bearing-piece upon the drag-bar for said connecting bar or roller of the springs, substantially as described.

In testimony whereof I have hereunto set my hand in the presence of two subscribing witnesses.

STACY B. HART.

Witnesses:
ALBERT H. NORRIS,
JAMES A. RUTHERFORD.